INVENTOR.
WILLIAM F. AVERY

Aug. 16, 1966       W. F. AVERY       3,266,221
ETHYLENE RECOVERY FROM GAS MIXTURES
Filed June 2, 1964                    3 Sheets-Sheet 3

INVENTOR.
WILLIAM F. AVERY
BY
John C. Ledener
ATTORNEY

United States Patent Office 3,266,221
Patented August 16, 1966

3,266,221
ETHYLENE RECOVERY FROM GAS MIXTURES
William F. Avery, Buffalo, N.Y., assignor to Union Carbide Corporation, a corporation of New York
Filed June 2, 1964, Ser. No. 372,030
8 Claims. (Cl. 55—58)

This invention relates to a process for recovering ethylene from gas mixtures, and more specifically to ethylene recovery from an ethylene oxide reactor off-gas.

Ethylene oxide is produced by reaction of ethylene and oxygen using a contact catalyst which is usually silver metal on a support, as for example, alumina or silicon carbide. The product ethylene oxide may in turn be converted to ethylene glycol by, for example, direct reaction with water. In addition to the desired direct reaction of oxygen with ethylene to produce ethylene oxide, a more complete reaction producing water and carbon dioxide occurs. Both of these reactions are exothermic, the second being an order of magnitude greater in the release of heat. One method of controlling this reaction is the use of inert diluent gas. Of course, when the oxygen reactant is supplied in part or entirely by air, nitrogen diluent is thereby introduced.

The off-gas from the ethylene-oxygen reaction contains air residues, primarily nitrogen as a principal constituent, ethylene and carbon dioxide as minor constituents and traces of other gases such as oxygen, low molecular weight saturated hydrocarbons such as ethane, and moisture. This off-gas is normally discarded in spite of its valuable ethylene content on the order of 5 percent.

An object of this invention is to provide a method for efficient recovery of this ethylene content of the ethylene oxide reactor off-gas. The resulting ethylene can then be recycled to the ethylene oxide reactor or passed to other ethylene consuming reaction processes.

Figure 1:
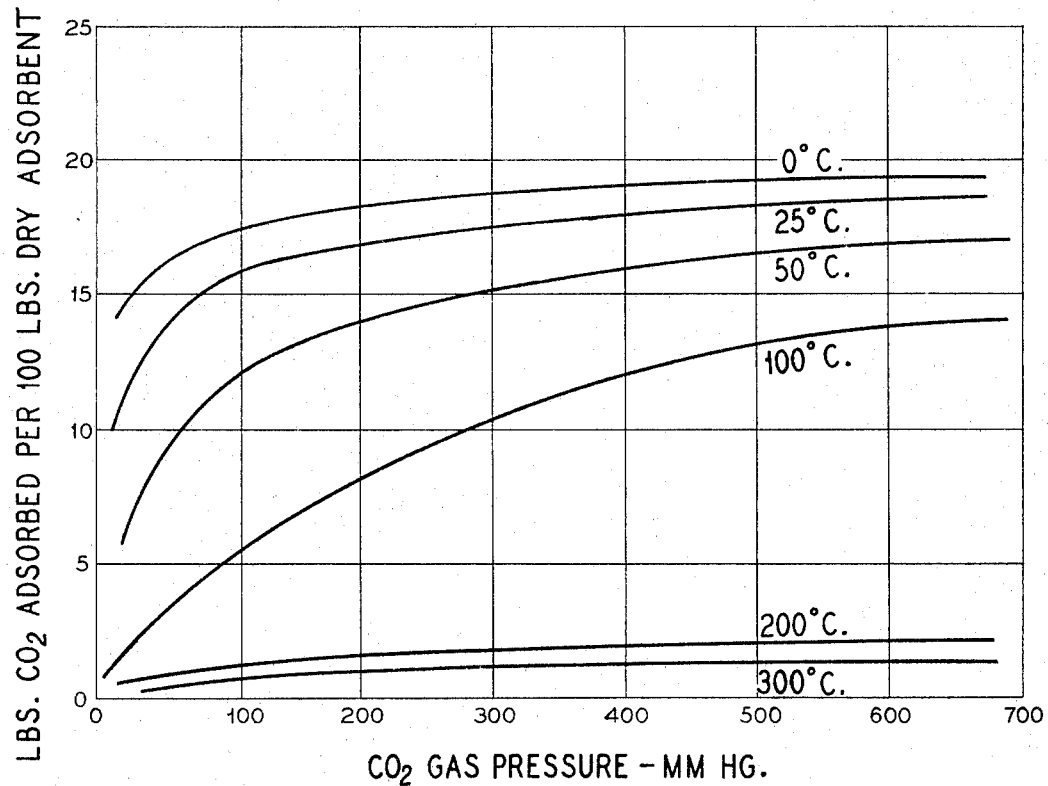
FIG. 1 is a carbon dioxide isotherm chart for adsorption in calcium zeolite A.

One embodiment involves the steps of providing an adsorption zone containing crystalline zeolitic molecular sieve bodies having voids therebetween. The gas mixture is introduced as feed at the inlet end of the zone and contacted with the molecular sieve at a first superatmospheric pressure and temperature of 0–150° C. The ethylene and carbon dioxide are selectively coadsorbed by the molecular sieve in preference to nitrogen, and part of the gas mixture is trapped in the void space. Carbon dioxide and ethylene form a coadsorption composition. In the range of about 20 to 40 mol percent ethylene (60–80 mol percent carbon dioxide), this coadsorbate is more strongly held by the molecular sieve than is the balance of either component which is in excess of the coadsorption composition. The latter of course is variable depending upon the conditions of temperature and pressure. Thus, if ethylene is present in the feed gas mixture in excess over the ethylene-carbon dioxide coadsorption composition, that excess ethylene will pass beyond the coadsorption composition mass transfer zone and form its own adsorption zone farther into the bed. Conversely, if carbon dioxide is in excess, that excess will be adsorbed in the zone beyond the coadsorption composition zone. In the instant process greater efficiency in the recovery of ethylene will result if it is all contained in the coadsorption composition zone. The front of an adsorption zone has a concentration gradient and the longitudinal distance between the leading edge and the trailing edge is the length of the front. It will be obvious that a relatively short front utilizes the adsorbent more efficiently than a relatively long front.

As flow of feed gas mixture into the inlet end of the molecular sieve bed continues, an ethylene and carbon dioxide-depleted effluent is discharged from the opposite or exit end of the bed. This effluent is primarily nitrogen but may contain traces of other feed gas constituents which are less strongly held than ethylene and carbon dioxide. On the other hand, any water present in the feed gas is retained by the molecular sieve.

The ethylene-carbon dioxide coadsorption front progressively moves longitudinally through the molecular sieve zone towards the exit end to a predetermined location intermediate the inlet and exit ends, and the feed flow is terminated. The coadsorption front and the ethylene adsorption front (if it exists) are not allowed to "break through" at the exit end of the zone. As used herein, the expression "break through" denotes that point of time in an adsorption step at which the concentration of a selected component materially increases in the effluent. Stated in another manner, break through is that point at which the leading edge of an adsorption front extends outside the exit end of the zone. According to this invention, the adsorption step is preferably terminated when the ethylene-carbon dioxide coloaded molecular sieve occupies only about 0.8 of the total volume of the bed. The remainder of the bed, containing carbon dioxide, is used during the first desorption stage.

As previously indicated the adsorption pressure may be any superatmospheric pressure higher than the desorption pressure and the pressures should be in a ratio of at least about 2 to 1 to obtain reasonable adsorbate working loadings of the process. The adsorbate loading is also affected by the temperature at which the process operates. Temperatures throughout the range of 0° C. to 150° C. may be employed. Temperatures below about 0° C. would require undesirably high pressure swing to obtain acceptable working loadings of ethylene. On the other hand, temperatures above about 150° C. would lead to decomposition of the ethylene. Also, above this temperature ethylene polymerization occurs which deactivates the molecular sieve by buildup of residues. That is, at higher temperatures the internal adsorption region of the sieve would tend to fill up with polyethylene which is relatively non-volatile and difficult to desorb.

In the present process the thermally activated decomposition and/or polymerization of ethylene is further guarded against by the presence of an appreciable preloading residue of carbon dioxide in the molecular sieve when the adsorption step is conducted, thereby reducing the heating effect of the ethylene adsorption.

Desorption is performed in three stages. During the first stage at least most of the nitrogen portion of the void space gas is removed through the exit end of the adsorption zone thereby cocurrently depressurizing the zone from the first higher pressure to a second lower pressure being less than one-half of the first pressure. During this first desorption stage, a portion of the ethylene loaded in the bed during adsorption is desorbed because of the reduced pressure and is displaced toward the exit end by the non-adsorbed gas flow. The portion of the bed which was not used for ethylene adsorption during the adsorption step is now used to readsorb this shifting load. Also, as the void space gas is drawn off it passes through the unused part of the molecular sieve bed and its ethylene content is adsorbed therein.

During the cocurrent blowdown step the ethylene-carbon dioxide adsorption front moves closer to the exit end and the leading edge of the front may actually reach this end. At the end of blowdown the bed contains an essentially uniform loading of coadsorbed ethylene and carbon dioxide of approximately the same ratio as was the loading in equilibrium with the adsorption feed. The separate step of cocurrent blowdown or depressurization does not constitute this invention, but is described more completely and claimed in copending application S.N. 221,033 filed September 4, 1962, in the names of K. Kiyonaga and H. W. Prendergast. The blowdown gas is essentially air residue and may be discarded.

The second stage of desorption is the passage of carbon dioxide purge gas through the molecular sieve adsorbent bed in a direction countercurrent to that of the preceding adsorption and depressurization steps. The carbon dioxide stream may be at any desired pressure and temperature, but is preferably at substantially the same temperature as that employed in the adsorption step so that the benefits of nearly isothermal operation and avoidance of ethylene decomposition are obtained. During this stage a mass transfer exchange front passes through the bed, the carbon dioxide being adsorbed and in so doing it displaces or desorbs the ethylene from the bed. The carbon dioxide loading behind the exchange front is increased to that loading which is in equilibrium with pure carbon dioxide under the existing conditions of pressure and temperature. The vapor phase carbon dioxide partial pressure at the leading edge of the front is that in equilibrium with the coadsorbed phase on the bed after current blowdown.

At the end of the second desorption stage the bed is loaded with carbon dioxide and is essentially in equilibrium with the pure carbon dioxide purge gas under the existing conditions. The carbon dioxide loading at the end of this stage is too high to permit a significant loading of ethylene in a succeeding adsorption step. That is, when the molecular sieve contains primarily carbon dioxide as an adsorbate, it will adsorb relatively little ethylene on contact with the feed gas mixture. To circumvent this problem the molecular sieve is reactivated by removing ta least part of the adsorbed carbon dioxide. This is accomplished by withdrawing carbon dioxide from one end of the adsorption zone thereby reducing the pressure of the carbon dioxide in the gas in equilibrium with the adsorbent. Pressures sufficient to leave from about 5 to 15 weight percent carbon dioxide preload residue on the molecular sieve will effect reactiavtion and at the same time retain enough $CO_2$ to substantially reduce the temperature rise due to heat of adsorption during the succeeding contact with feed gas mixture. The reactivation pressure needed to reduce the carbon dioxide loading to the desired level at the operating temperature may be determined in a manner well-known to those skilled in the adsorption art. Alternatively, the pressure may be obtained from an isotherm chart for the particular molecular sieve adsorbent, such charts being obtainable from a molecular sieve manufacturer such as Union Carbide Corporation, Linde Division, 270 Park Avenue, New York city, New York. FIG. 1 is a carbon dioxide isotherm chart for calcium zeolite A, a suitable molecular sieve for use in the instant process. Inspection of this isotherm reveals that if the operating temperature were about 25° C., then a preload reactivation pressure of 1 p.s.i.a. leaves about 14 weight percent $CO_2$ on the adsorbent. The reactivation of the carbon dioxide purge-containing molecular sieve zone may be effected by flowing at least part of the ethylene and carbon dioxide depleted effluent, from the adsorption step, through the zone.

Ideally, the carbon dioxide preload residue is the same amount as is present in the coadsorbed composition resulting from the adsorption step. In this situation none of the carbon dioxide in the feed stream is adsorbed. There is no heat effect of carbon dioxide adsorption during the adsorption step and at the end of the adsorption and cocurrent depressurization steps all of the carbon dioxide introduced in the feed gas has been discharged in the effluent. From a practical standpoint this ideal condition is rarely achieved and some warmup due to carbon dioxide adsorption is experienced.

Returning now to the desorbate from the second stage desorption, this is a mixture of ethylene and carbon dioxide in approximately the same ratio as in the feed gas mixture to the process, but the primary nitrogen constituent has been separated. The ethylene and carbon dioxide in the desorbate may be separated by conventional liquid adsorption methods, as for example contact with aqueous monoethanolamine or hot potassium carbonate followed by aqueous ammonia treating and caustic scrubbing. The resulting substantially pure ethylene is withdrawn as a product. The carbon dioxide is recycled with the carbon dioxide desorbed during the reactivation or third desorption stage as at least part of the previously described carbon dioxide purge gas for the second desorption stage following the cocurrent blowdown or depressurization step.

Figure 2:
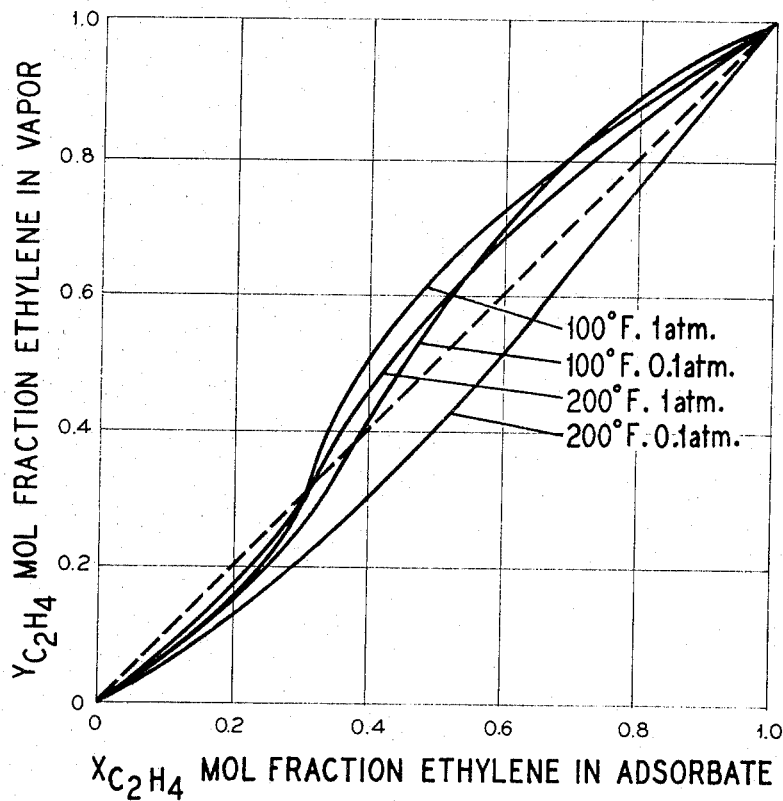
FIG. 2 is a graph showing the vapor-adsorbate equilibria for carbon dioxide-ethylene in calcium zeolite A.

The vapor-adsorbate equilibrium for carbon dioxide-ethylene mixtures on molecular sieves in the temperature and pressure conditions of the present process are illustrated in the FIG. 2 graph. While the curves are based on experiments with calcium zeolite A, the relationships discussed hereinafter are also existent with other crystalline molecular sieves. The hypothetical equal vapor-adsorbate concentrations for ethylene are shown by the 45-degree dotted line, and this line will be used as a reference for the ensuing discussion. It will be apparent from an examination of the 100° F.–1 atm. and 100° F.–0.1 atm. lines that as long as the gas mixture contains more than about 0.3–0.4 mol fraction ethylene, the calcium zeolite A will adsorb a lesser mol fraction of ethylene under these conditions. This represents the portion of FIG. 2 where the curves cross the 45-degree dotted line. For example, when the feed gas mixture contains 0.5 mol fraction ethylene at 100° F. and 1 atm., the adsorbent contains 0.4 mol fraction ethylene and 0.6 mol fraction carbon dioxide. This means that the molecular sieve is selectively adsorbing carbon dioxide in preference to ethylene, and the gas phase consequently is ethylene-rich relative to the adsorbed phase. Under these circumstances the ethylene adsorption front becomes longer and during the cocurrent depressurization step ethylene may be lost or void-space non-adsorbed air residues are left in the bed. Thus, the process is less effective in reaching the highest purity and recovery of the ethylene. An ethylene-rich condition can be, if desired, avoided by adding carbon dioxide to the feed to bring the composition within or below the 0.3–0.4 mol fraction ethylene range.

The vapor-adsorbate equilibrium lines of FIG. 2 also reveal that when the gas mixture contains less than about 0.3–0.4 mol fraction ethylene, the calcium zeolite A adsorbs ethylene more strongly than carbon dioxide, and the vapor phase is consequently enriched in carbon dioxide. For example, when the feed gas mixture contains 0.1 mol fraction ethylene and 0.9 mol fraction carbon dioxide at 1 atm., the adsorbent contains 0.14 mol fraction ethylene and 0.86 mol fraction carbon dioxide. As previously indicated, a preferred embodiment of this invention employs feed gas mixtures having less than about 0.3 mol fraction ethylene per one mol of ethylene and carbon dioxide. This permits maximum ethylene recovery.

Molecular sieves are three-dimensional crystalline aluminosilicates physically characterized by uniformly sized small pores leading from the exterior surface to an internal three-dimensional cagework formed of interconnected silica and alumina tetrahedra. Only about 1% of the available surface area of molecular sieves is on the outer side so that most of the adsorption occurs by passage of molecules through the pores into this inner cagework, and adsorption therein. This is in contrast to conventional adsorbents such as silica gel and activated charcoal which do not have large inner adsorption regions and consequently are characterized by lower adsorptive capacity. Molecular sieves have a particularly strong affinity for molecules which are unsaturated, polar or polarizable, thereby accounting for their selectivity for ethylene (an unsaturated molecule) and carbon dioxide (a polar molecule). The adsorbent is preferably employed in the form of compressed pellets which may contain a clay binder.

Among the molecular sieves suitable for use in the process are the naturally occurring chabazite, erionite, mordenite and faujasite. These materials are adequately described in the chemical literature. The suitable synthetic molecular sieves include types A, D, L, R, T, X and Y. Other molecular sieve-type compounds include the synthetic mordenite material described in Belgian Patent No. 626,790. The preferred zeolitic molecular sieves are those having pore sizes of at least 4.6 Angstrom units and include erionite, calcium-rich chabazite, faujasite, the synthetic zeolites L, X and the divalent cationic forms of zeolite A, D and R. The larger pore size permits more rapid adsorption and desorption of the carbon dioxide molecules leading to faster and thus more efficient operating cycles.

Zeolite A may be represented by the formula:

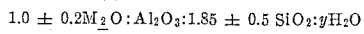

wherein M represents a cation, $n$ is the valence of M, and $y$ may have any value up to about 6. The as-synthesized zeolite A contains primarily sodium ions and is designated sodium zeolite A. Zeolite A is described in more detail in U.S. Patent No. 2,882,243, issued April 14, 1959.

Zeolite X is a synthetic crystalline zeolitic molecular sieve whose composite may be expressed in terms of oxide mol ratios as follows:

$$1.1 \pm 0.4[xNa_2O:(1-x)K_2O]:Al_2O_3:6.9 \pm 0.5SiO_2:yH_2O$$

wherein $x$ is any value from about 0.1 to about 0.8 and $y$ is any value from about zero to about 8. Further characterization of zeolite T by means of X-ray diffraction techniques is described in U.S. Patent No. 2,950,952, issued August 30, 1960.

Zeolite X is a synthetic crystalline zeolitic molecular sieve which may be represented by the formula:

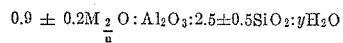

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244, issued April 14, 1959.

Zeolite Y is described and claimed in U.S. Patent No. 3,130,007, issued April 21, 1964 to D. W. Breck.

Zeolite L is described and claimed in U.S. patent application Serial No. 214,479, filed August 3, 1962 in the names of D. W. Breck and N. A. Acara.

Zeolite D is described and claimed in U.S. Patent application Serial No. 273,549, filed April 17, 1963 in the names of D. W. Breck and N. A. Acara.

Figure 3:
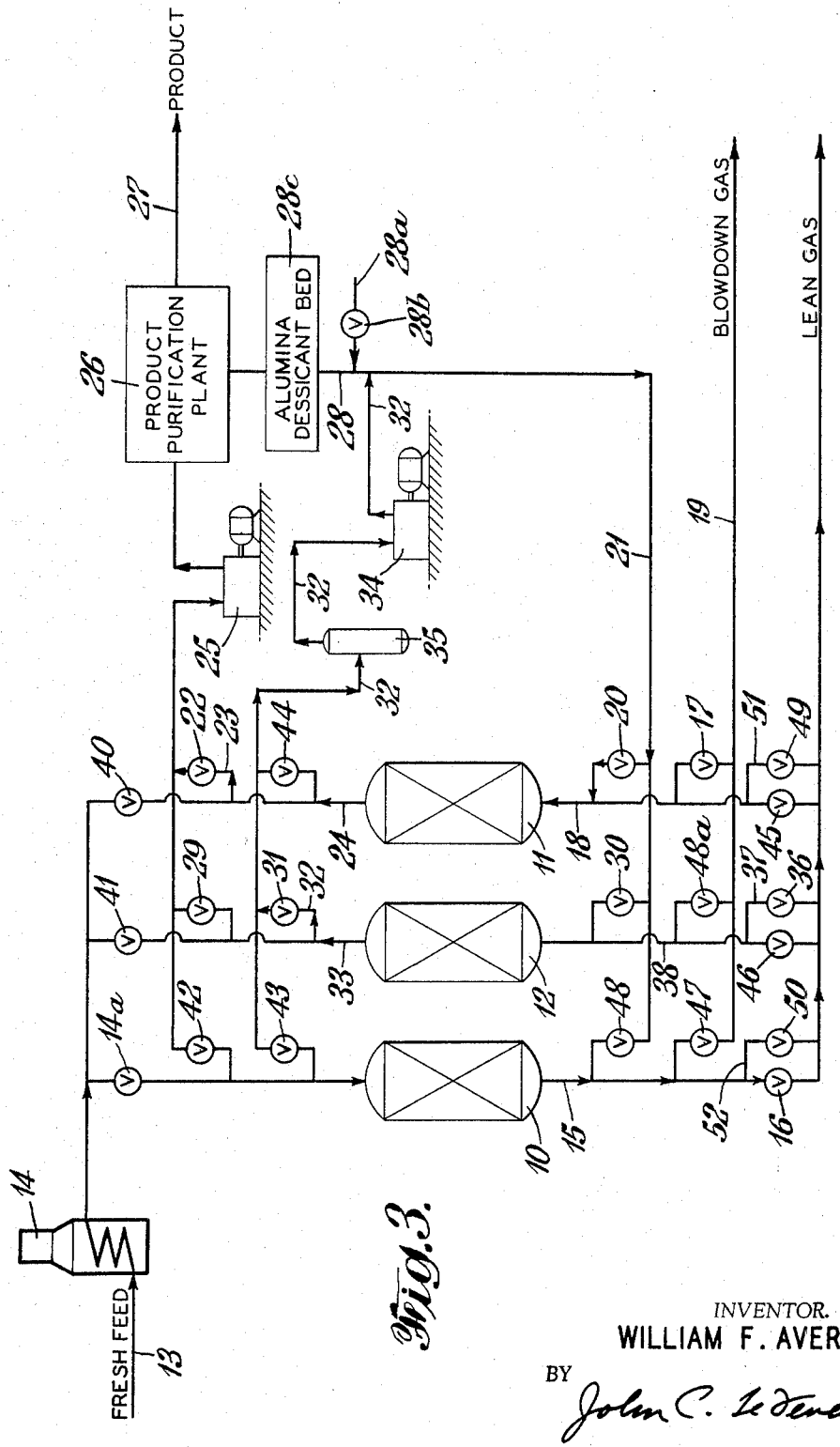
FIG. 3 is a schematic flowsheet for a three-adsorption zone process for recovering ethylene from ethylene oxide reactor off-gas according to this invention.

The invention will be more completely understood by a description of the commercial embodiment illustrated schematically in FIG. 3. Whereas the process has previously been described in its simplest form with only one adsorption zone consecutively experiencing the adsorption step and three desorption steps, most large-scale installations require multiple adsorption zones so that the flows of feed gas and product ethylene are continuous. In FIG. 3, three adsorption zones 10, 11 and 12 are provided and piped in parallel flow relation, each zone containing agglomerates of a suitable molecular sieve, e.g. calcium zeolite A. The zones are cycled rapidly, so that the illustrated valves are automatically controlled in accordance with a predetermined time sequence.

A typical ethylene oxide reactor off-gas may have the following composition in mol percent:

| | |
|---|---|
| Ethylene | 4.50 |
| Carbon dioxide | 8.99 |
| Oxygen | 3.80 |
| Ethane | 0.40 |
| Nitrogen | 82.11 |
| Water | 0.20 |

This off-gas is supplied at about 23° C. and 135 p.s.i.g. to conduit 13 and hence to heater 14 where it is warmed to 85° C. and then passed through control valve 14a to the upper end of first molecular sieve zone 10. Adsorption pressures of about 2 to 20 atmospheres and temperatures of 25° C. to 125° C. are preferred as an optimum balance between high adsorbate loadings and minimum power costs. First zone 10 contains a residual carbon dioxide loading from its previous desorption cycle, and on contact with the feed gas ethylene is adsorbed along with part of the carbon dioxide. Also a portion of the feed gas is trapped in the voids between the molecular sieve bodies in the bed. An effluent gas is discharged from the lower end of first adsorption zone 10 into conduit 15 having control valve 16 therein, and contains nitrogen, other nonadsorbed feed constituents and carbon dioxide. The effluent gas emerges from the system through control valve 16 and is vented to the atmosphere or processed for further use as desired. The water traces in the feed gas are adsorbed in the molecular sieve bed. First molecular sieve zone 10 is on the adsorption step for 5 minutes and the zone temperature rises to about 105° F. due to heats of adsorption.

During this same period, second molecular sieve adsorption zone 11 is proceeding through the first and second stages of the desorption step, that is, cocurrent depressurization for about 20 seconds, valve changes for 6 seconds, and countercurrent displacement with carbon dioxide gas for 4 minutes-34 seconds. To accomplish these stages, valve 17 in discharge conduit 18 is opened slowly to control the cocurrent blowdown rate of second zone 11. The blowdown gas discharged is from the system through connecting conduit 19 for further use as desired. As previously indicated this blowdown gas is primarily nitrogen, and during this stage the ethylene-carbon dioxide coadsorption front as well as the separate ethylene and carbon dioxide fronts move downwardly towards the discharge end of second zone 11. When the pressure within zone 11 falls to approximately atmospheric, valve 17 closes and valve 20 in carbon dioxide purge inlet conduit 21 and valve 22 in purge discharge conduit 23 open.

Carbon dioxide gas at about 85° C., and 17 p.s.i.a. supplied to conduit 21 passes through control valve 20 and connecting conduit 18, and is introduced into the exit end of second zone 11. This purge gas flows longitudinally through the zone and progressively displaces the ethylene adsorbate. The resulting desorbate-containing carbon dioxide purge gas is discharged through the feed inlet of second molecular sieve zone 11 into conduit 24 at the upper end thereof and is directed through connecting conduit 23 and control valves 22 therein to compressor 25. The latter pressurizes the resulting carbon dioxide-ethylene gas mixture to a suitable level for separation in a conventional liquid absorption system 26, as for example 15–20% aqueous monoethanolamine. Liquid absorption system 26 requires an absorber and interconnected strippers, refluxers and heat exchangers as is well understood by those of ordinary skill and described more completely in "Petroleum Refiner Magazine," December 1957.

The unabsorbed ethylene of at least 90% purity is withdrawn from absorption system 26 as product gas through conduit 27, and may be recycled to the ethylene oxide reactor if desired. The carbon dioxide having been stripped from the aqueous monoethanolamine absorbent is recycled through conduit 28 to joining conduit 21. If the quantity of recycled carbon dioxide is insufficient for displacement of the ethylene adsorbate, additional carbon dioxide make-up gas may be introduced through conduit 28a having control valve 28b therein.

The carbon dioxide which is being recycled from liquid absorption system 26 for use as a countercurrent displacement purge gas in molecular sieve adsorption zones 10, 11 and 12 is substantially completely saturated with water. Most of this water must be removed before entering the adsorption zones so that the gas should be dried to a dew point of −80° C. or below. This may be accomplished by well-known adsorption techniques, as for example alumina dessicant bed 28c.

During the five-minute period in which first molecular sieve zone 10 is on the adsorption step and second zone 11 is progressing through the first and second stages of desorption, third molecular sieve zone 12 is undergoing the third or reactivation stage of desorption. Third zone 12 has just completed the carbon dioxide displacement stage of desorption and is loaded with carbon dioxide. It has been previously indicated that this adsorbed carbon dioxide is partly removed so that the molecular sieve will reacquire its preference for ethylene as compared with carbon dioxide. To accomplish this, the previously opened control valves 29 and 30 at the feed inlet and discharge ends, respectively, of third zone 12 are closed to shut off carbon dioxide purge gas flow. Next, control valve 31 in conduit 32 at the feed inlet end is slowly opened. Conduit 32 joins on one end with feed inlet conduit 33 and on the other end with vacuum compressor 34 through condensate knock-out drum 35. The vacuum compressor is capable of drawing an intake pressure of 6.5 p.s.i.a. and discharging at 17 p.s.i.a. It is employed to remove the carbon dioxide during the third desorption stage to the desired residual or preloading level. This may be as low as about 1 pound of carbon dioxide per 100 pounds of molecular sieve adsorbent. The actual vacuum pressure required to attain such preloading depends on the temperature of the molecular sieve adsorbent bed. When the flow of displacement purge gas to second zone 11 through conduit 18 begins, the carbon dioxide adsorbate being drawn off third zone 12 through connecting conduits 33 and 32 by vacuum compressor 34 is blended at about 17 p.s.i.a. with the carbon dioxide gas recycled in conduit 28 from the ethylene-carbon dioxide absorption separation system 26. This is a suitable pressure for supplying carbon dioxide to the recycle steam employed in the second desorption stage. When the pressure within third molecular sieve zone 12 drops to about 6 p.s.i.a., valve 31 closes and the zone is completely isolated at sub-atmospheric pressure.

The reactivated third zone 12 may now be repressurized with feed gas. In another and preferred method, zone 12 is repressurized with the feed effluent from first zone 10. This aids in establishing a sharper ethylene-carbon dioxide coadsorption mass transfer zone with less ethylene appearing at the exit end of the zone. More specifically, to prepare third molecular sieve zone 12 for the next adsorption step, control valve 36 in branch conduit 37 is opened slowly to allow non-adsorbed effluent gas leaving first zone 10 through conduit 15 to flow through conduit 37 and lean gas conduit 38 into zone 12. The latter is countercurrently repressurized in this manner and when the adsorption pressure of about 135 p.s.i.g. has been reached, third molecular sieve zone 12 is prepared to repeat the adsorption step. Second molecular sieve zone 11 has completed the carbon dioxide displacement stage of the desorption step, and is now ready for the previously described reactivation stage.

An appropriate time sequence for the third stage reactivation is as follows:

| | |
|---|---|
| Valve changes | 0 minutes–6 seconds. |
| Repressurize vacuum compressor | 0 minutes–14 seconds. |
| Vacuum desorption | 4 minutes–19 seconds. |
| Valve changes | 0 minutes–6 seconds. |
| Repressurization | 0 minutes–15 seconds. |
| | 5 minutes–0 seconds. |

It will be apparent from the foregoing description of the FIG. 2 three-zone embodiment that one zone is on the adsorption step while the other two zones are being desorbed. Those skilled in the art will also recognize from this description and FIG. 3 how the valves are manipulated to effect the desired flow changes to place first zone 10 on desorption and second or third zones 11 and 12 on the adsorption step. The necessary valves corresponding to previously identified valves are illustrated. For example, at the feed inlet end, valves 40 and 41 communicate with molecular sieve adsorbent zones 11 and 12, respectively, and correspond to zone 10 inlet valve 14a. Also at the feed inlet end, valve 42 communicating with first zone 10 corresponds to ethylene-carbon dioxide desorbate discharge valves 22 and 29 which communicate respectively with second and third molecular sieve zones 11 and 12. Similarly, carbon dioxide desorption discharge valves 43 and 44 communicating with first and second zones 10 and 11 correspond to valve 31 communicating with third zone 12.

Referring now to the non-adsorbed effluent end of the three zones, valves 45 and 46 communicating with second and third zones 11 and 12 correspond to effluent valve 16 communicating with first molecular sieve zone 10. Also valves 47 and 48 communicating with first and third zones 10 and 12 correspond with cocurrent blowdown valve 17 for second zone 11. The recycled carbon dioxide gas in conduit 21 may be introduced to the effluent end of the first zone 10 through valve 48, corresponding to valves 20 and 30 for second and third zones 11 and 12, respectively. Second and first zones 11 and 10 may be repressurized with effluent gas by diversion of same from conduit 15 through valves 49 and 50 in bypass conduits 51 and 52, each corresponding to valve 36 and bypass conduit 37 communicating with third zone 12.

Although preferred embodiments of the process of this invention have been described in detail, it will be appreciated that modifications may be made and that some features may be employed without others, all within the scope of the invention.

What is claimed is:

1. A process for recovering ethylene from a gas mixture containing nitrogen as the principal constituent and at least ethylene and carbon dioxide as minor constituents, comprising the steps of providing said gas mixture and an adsorption zone of crystalline zeolitic molecular sieve bodies having voids between the bodies; introducing said gas mixture as feed at the inlet end contacting same with the molecular sieve zone at first subatmospheric pressure and temperature of 0–150° C., thereby selectively coadsorbing said ethylene and carbon dioxide in the molecular sieve and trapping part of said gas mixture in said voids; discharging an ethylene and carbon dioxide-depleted effluent from the exit end of said molecular sieve zone; establishing at least an ethylene-carbon dioxide coadsorption front at the inlet end and progressively moving such front longitudinally through said molecular sieve zone to a predetermined location intermediate said inlet and exit ends and terminating the introduction of said gas mixture to the molecular sieve zone; removing at least most of the nitrogen portion of the void space gas through the exit end of said zone whereby cocurrently depressurizing the zone from the first pressure to a second lower pressure being less than one-half the first pressure;

introducing carbon dioxide purge gas to the exit end of said molecular sieve zone and flowing said carbon dioxide longitudinally toward the inlet end thereby displacing the adsorbed ethylene and being itself adsorbed, and discharging a desorbate from the inlet end comprising ethylene and carbon dioxide; partially removing the adsorbed carbon dioxide displacement gas from the molecular sieve zone thereby reactivating the zone for subsequent contact with the feed gas mixture; separating the ethylene and carbon dioxide in the desorbate and withdrawing the separated ethylene as product; and recycling the desorbed carbon dioxide displacement gas and the carbon dioxide separated from the product ethylene as at least part of said carbon dioxide purge gas.

2. A process according to claim 1 in which the carbon dioxide purge-containing molecular sieve zone is reactivated by withdrawing carbon dioxide from one end of the molecular sieve zone in sufficient quantity to reduce the pressure in the zone to about 1 p.s.i.g.

3. A process according to claim 1 in which the carbon dioxide purge-containing molecular sieve zone is reactivated by flowing at least part of the ethylene and carbon dioxide-depleted effluent through the zone.

4. A process according to claim 1 in which the feed gas mixture contacts the molecular sieve zone at temperature of 25–125° C. and pressure of 2–20 atmospheres.

5. A process according to claim 1 in which the reactivated molecular sieve contains a residual carbon dioxide loading of between about 5 and 15 weight per cent.

6. A process according to claim 1 in which the carbon dioxide purge-containing molecular sieve is reactivated by withdrawing carbon dioxide from one end of the molecular sieve zone in sufficient quantity to reduce the pressure in the zone to about 1 p.s.i.g., repressurized to about said first superatmospheric pressure by flowing at least part of the ethylene and carbon dioxide-depleted effluent into the molecular sieve zone, and thereafter returned to the adsorption step by introduction of the feed gas mixture.

7. A process according to claim 1 in which the ethylene and carbon dioxide occupy about 0.8 of the total volume of the adsorption zone at the end of the adsorption step.

8. A process according to claim 1 in which said gas mixture contains less than about 0.3 mol fraction ethylene per one mol of ethylene and carbon dioxide.

References Cited by the Examiner

UNITED STATES PATENTS 3,176,445  4/1965  Collins et al. _____ 55—15 X

REUBEN FRIEDMAN, *Primary Examiner.*

UNITED STATES PATENT OFFICE
CERTIFICATE OF CORRECTION

Patent No. 3,266,221                                       August 16, 1966

William F. Avery

It is hereby certified that error appears in the above numbered patent requiring correction and that the said Letters Patent should read as corrected below.

Column 8, line 59, for "subatmospheric" read -- superatmospheric --.

Signed and sealed this 22nd day of August 1967.

(SEAL)
Attest:

ERNEST W. SWIDER                          EDWARD J. BRENNER
Attesting Officer                             Commissioner of Patents